United States Patent [19]

Hawkins

[11] Patent Number: 5,123,195
[45] Date of Patent: Jun. 23, 1992

[54] METHOD AND APPARATUS FOR SEPARATING TARGETED SPECIES OF AQUATIC LIFE

[75] Inventor: Jerry D. Hawkins, San Antonio, Tex.

[73] Assignees: Jerry D. Hawkins, Jr.; Sheryl A. Salinas; Diana L. Adair, all of Corpus Christi, Tex.

[21] Appl. No.: 624,208

[22] Filed: Dec. 7, 1990

[51] Int. Cl.⁵ .............................. A01K 73/02
[52] U.S. Cl. .......................... 43/9.2; 43/9.6
[58] Field of Search ............. 43/9.2, 9.6, 17.1

[56] References Cited

U.S. PATENT DOCUMENTS

| | | | |
|---|---|---|---|
| 2,745,205 | 5/1956 | Kafka | 43/17.1 |
| 3,312,011 | 4/1967 | Wathne et al. | 43/9.6 |
| 3,483,649 | 12/1969 | Klima et al. | 43/9.6 |
| 3,491,474 | 1/1970 | Metcalf, Jr. | 43/9.6 |
| 4,805,335 | 2/1989 | West et al. | 43/9.2 |

FOREIGN PATENT DOCUMENTS 0493215 2/1976 U.S.S.R. ............. 43/17.1

OTHER PUBLICATIONS

U.S. Design for "separator" Shrimp, World Fishing, vol. 18, No. 6, Jun. 1969, pp. 60–62.
New Dutch Beam Trawl Stops Flatfish Slaughter, "World Fishing" Jun. 1965 pp. 96, 99.

*Primary Examiner*—Kurt Rowan
*Assistant Examiner*—James Miner
*Attorney, Agent, or Firm*—Gunn, Lee & Miller

[57] ABSTRACT

A shrimp trawl or net having a second piggyback net attached to an opening in the top side of the body of the trawl and a pulser to stimulate mature shrimp to enter the opening in the second net. Alternatively, an upper deck is formed in the body of the main trawl and the pulser is positioned so as to stimulate the targeted shrimp species to enter the upper deck while non-targeted species and debris pass out the back of the trawl. Both the piggyback net and the upper deck have a releasably closable back end to allow the operator to close the net or deck during towing operations, and to open the back end after the trawl has been pulled aboard the shrimp boat.

9 Claims, 3 Drawing Sheets

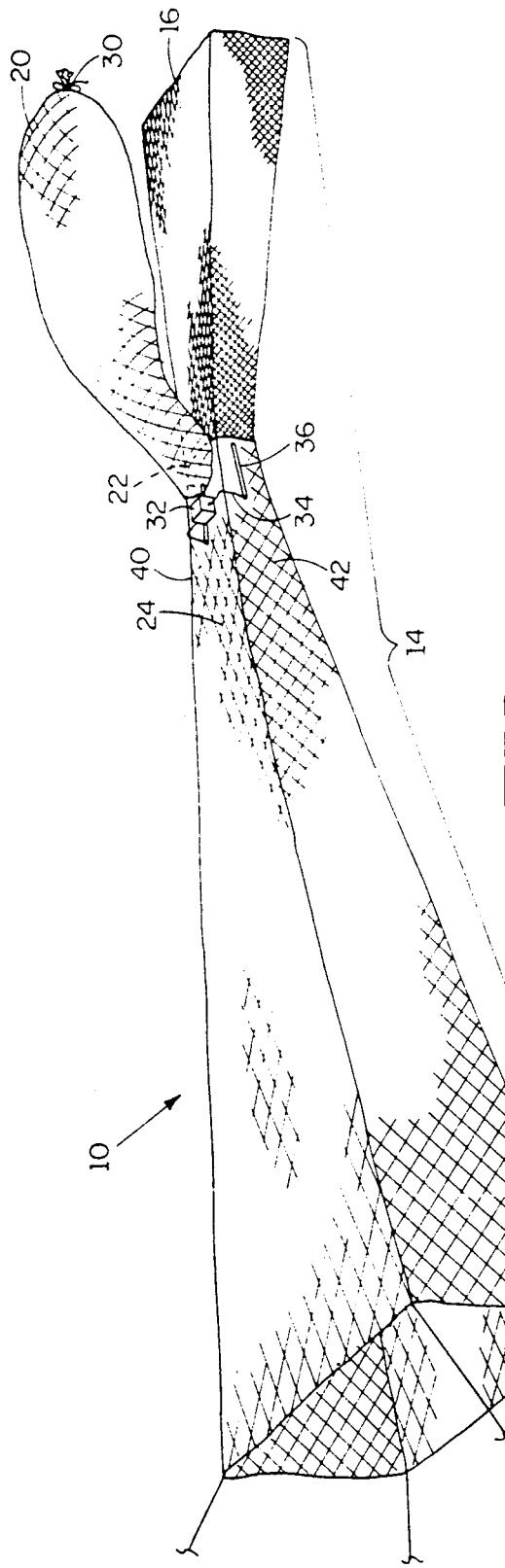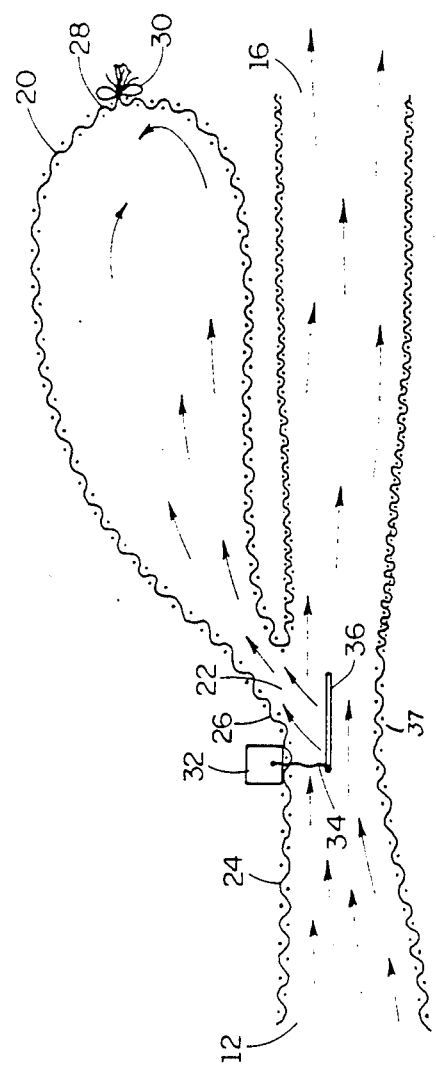

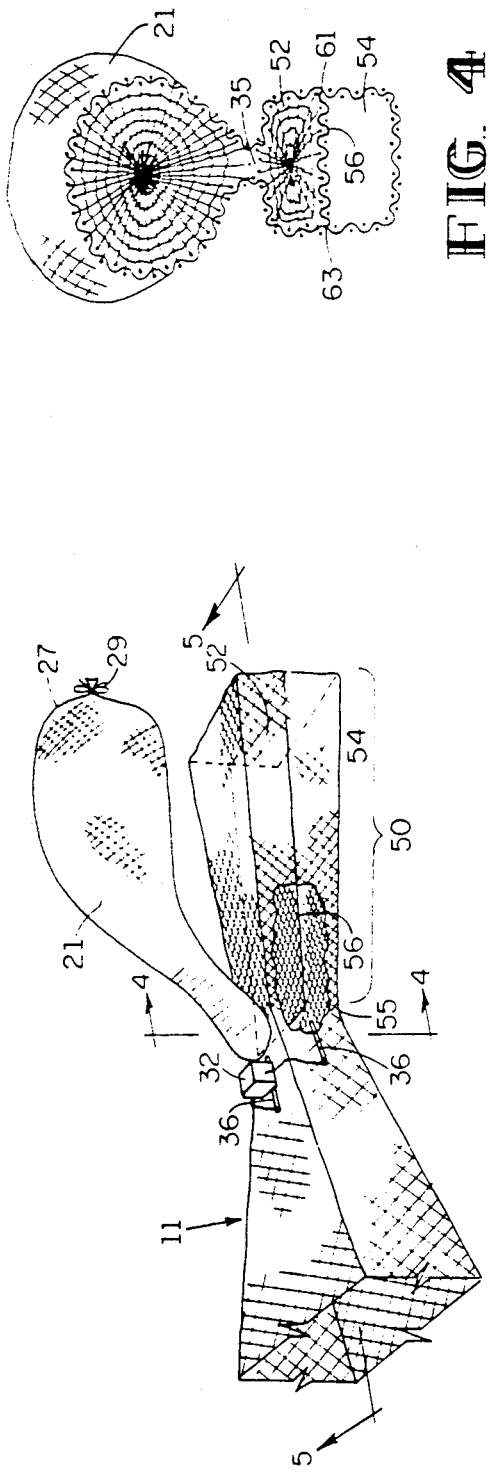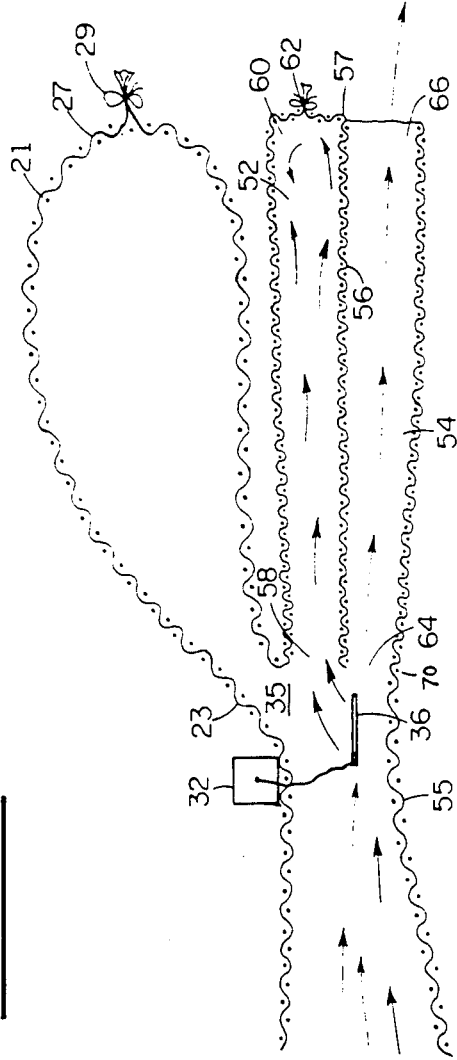

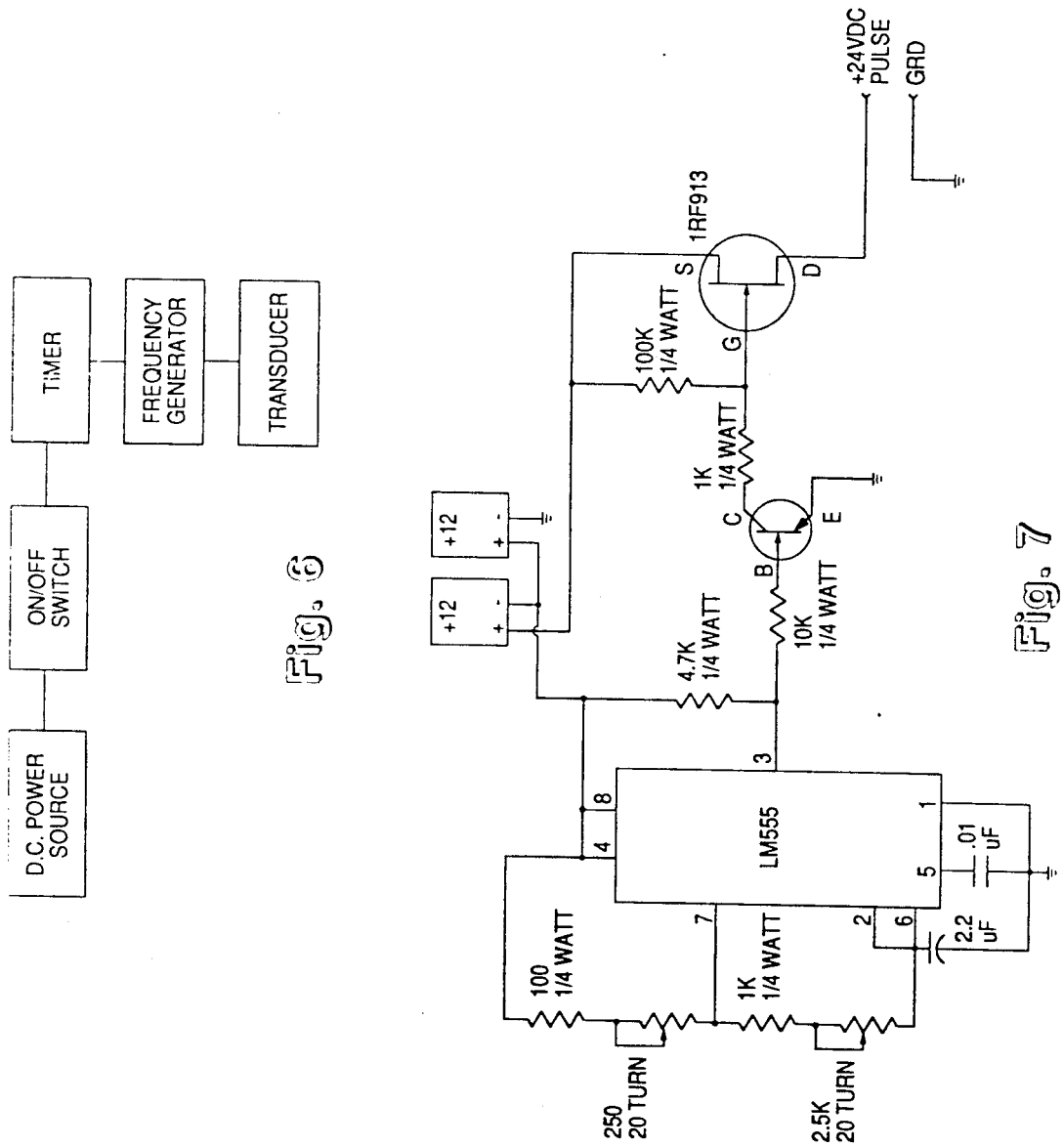

METHOD AND APPARATUS FOR SEPARATING TARGETED SPECIES OF AQUATIC LIFE

BACKGROUND OF THE INVENTION

The present invention relates to a method and apparatus for selectively separating targeted species of aquatic life from non-targeted species during underwater harvesting operations. Specifically, the invention separates targeted mature shrimp from other non-targeted aquatic organisms in shrimp trawls allowing the non-targeted organism to pass out the open back end of the trawl while capturing the targeted mature shrimp in a separated closed portion of the trawl.

Traditionally shrimp nets or trawls have had an open front end which is opened during towing operations to allow aquatic organisms to be captured within the confines of the trawl or net. The cod end or back end of the trawl is closable and is closed during the towing of the net underwater. Thus, all species are accumulated in the net and must be separated when the net is removed from the water. Normally, the net is withdrawn from the water and the closable end (cod end) is opened to release the harvested aquatic life. Non-targeted species such as fish, turtles, porpoises and jellyfish are returned to the water while the mature shrimp are retained.

Unfortunately, many of the non-targeted species die before they may be returned to the water. In many cases, the non-targeted species are crushed within the trawl by incoming aquatic life and even non-living debris from the floor of the water body. It is not uncommon for thousands of juvenile fish (approximately 1" long) to be found dead at the back of the net when the shrimp net is pulled up. This results in a reduced fish population and lowering certain fish catch limits. Ultimately, all of this has a long-term negative financial impact on the fishing industry. Also, a percentage of the targeted shrimp species are also crushed, reducing the efficiency of the harvest. To reduce these problems, shrimpers have tended to shorten the time period of a particular tow and withdraw the trawls more often to separate the targeted and non-targeted species and debris. There are considerable costs associated with the time lost in pulling in and putting out the nets more often.

Further environmental problems have resulted in that certain non-targeted species such as the turtle are endangered as a result of being captured and dying in increased shrimp harvesting processes. In an effort to protect certain species of turtle, regulations have been put into effect which require the use of a turtle exclusion device (TED) on shrimp trawls. Essentially a TED is a mechanism placed on the top side of the shrimp trawl which functions as an open door to allow turtles captured through the open, front end of the net to pass out an opening in the body of the net while other species including fish, shrimp, horseshoe crabs, jellyfish, etc., pass to the closed cod end of the net. While TED's have reduced the number of turtles which are captured and die during shrimp harvesting operations, shrimp just as easily pass through the open TED; thereby reducing the productivity of the shrimping operation.

The present invention utilizes a method and apparatus which selectively directs mature shrimp into a collection net portion of the trawl while allowing the non-targeted species and debris to pass out the back end of the trawl.

The present invention not only allows non-targeted species to pass through the trawl, but also allows immature shrimp to avoid capture and harvesting. Such a selection process ultimately results in an increase in available mature shrimp for subsequent harvesting. Thus the numerous problems associated with the current trawls are eliminated while increasing the productivity of the harvesting operations.

SUMMARY OF THE INVENTION

The present invention is a specially designed shrimp trawl or net which has a separate collection section formed in the trawl either as a second, piggyback net or as an upper deck in the cod end of the main net. The back end of the non-collection section is open to allow non-targeted species and debris to pass out of the trawl during towing of the net. At the throat of the trawl, a pulsing apparatus is attached to the net to stimulate mature shrimp to "jump" or move upwardly into the opening of the piggyback net or the upper deck of the trawl. The back end of the piggyback net or upper deck is releasably closable to enable the shrimp operator to close the net or deck during the towing and collection process, and to open the net or deck once the net is aboard the shrimp boat so as to release the harvested shrimp for icing and storage.

BRIEF DESCRIPTION OF THE DRAWINGS

FIG. 1 illustrates a perspective view of the apparatus of the present invention.

FIG. 2 shows a partial cross sectional view of the apparatus of the present invention.

FIG. 3 illustrates a perspective view of an alternative embodiment of the apparatus of the present invention.

FIG. 4 shows a cross sectfional view of the alternative embodiment of the apparatus of the present invention taken along lines 4—4 of FIG. 3.

FIG. 5 shows a cross sectional view of the alternative embodiment of the apparatus of the present invention taken along lines 5—5 of FIG. 3.

FIG. 6 is a block diagram of the pulser of the present invention.

FIG. 7 is a schematic diagram of a typical pulser of the present invention.

DETAILED DESCRIPTION OF THE PREFERRED EMBODIMENT

FIG. 1 illustrates a perspective view of the present invention as it is being towed underwater. For simplicity, tow lines, doors, tickler chains, bibs, and floats are not shown. The front opening 12 of trawl or net 10 is shown in the open position. The height and width of opening 12 may be varied by many factors known to shrimp harvesting operators. Such openings may range from small (25 foot), designed for bays and more shallow bodies of water, to large (65 foot) for gulf or ocean operations.

The body portion 14 of the net 10 extends from the front opening 12 to the closable back end 16 of the net. The back end of the net is also called the cod end and this is the area where the catch is collected in the standard shrimp trawl or net. Normally, the cod end is closed by a draw rope during towing of the net under water, and is then opened, by the release of the draw rope when the net is withdrawn from the water and placed on the deck of the towing boat. Many features of the net may be discussed such as mesh opening size, twine thickness, material composition, and the like, but these matters are all well known in the art by one of ordinary skill.

FIGS. 1 and 2 illustrate the unique "piggyback" second net 20 of the present invention which extends from an opening 22 in the top side 24 of the body portion 14 of the basic trawl 10. The second net has a first open end 26 and a second closable end 28. A draw rope 30 similar to that normally used on the back end of the basic trawl is shown such that the second end of the piggyback net is closed during towing operations. Also seen in FIGS. 1 and 2 is a pulsing apparatus 32, including lead lines 34, and electrodes or transducers 36. Pulser 32 is attached to the body portion 14 of the net with lead lines 34 running to electrodes 32 immediately below opening 22. Transducers or electrodes 36 are positioned parallel to each other on opposite side walls 40 and 42 above the floor 37 of the body portion 14 and parallel to the longitudinal axis of the trawl 10.

FIG. 6 is a general block diagram of the pulser mechanism. Pulsers of this type are generally well known, but not utilized in the present type of situation. The power source is a d.c. battery which operates in the range of 5 to 24 volts. The power source may be switched on or off remotely to activate the timer, frequency generator and transducer. The frequency generator generates a square wave in the range of 225-350 Hz and the timer pulses the wave in the range of 3-5 pulses per second. The pulse is transmitted to the water medium through the transducers. FIG. 7 is a typical schematic diagram of a pulser circuit of the present invention.

In operation, trawl 10 is towed in the conventional method known to shrimp boat operators, with pulser 32 activated and transmitting pulses in the frequency range of 225-350 Hz pulsed at 3-5 pulses per second. As aquatic life (including mature shrimp) and debris enter the throat of the trawl it is exposed to the pulses created by pulser 32. Mature shrimp (shown as solid arrows in the flow) are sensitive to the pulses and tend to "jump" as they sense the pulse. Thus the targeted species move from the main stream of the flow and move upwardly toward the opening 22 in the top side of the net. Other aquatic life (including immature shrimp) and debris (shown as dotted arrows in the flow) are not sensitive to the pulses and remain unaffected. These non-targeted species and the debris continue to flow through the main portion of the trawl and out the open back end 16.

The targeted species are collected in the second piggyback net 20 because the second, back end 28 is drawn closed by rope 30. When the operator determines that the second net 20 contains sufficient quantities of the targeted shrimp species, the pulser may be shut off (remotely) and the entire trawl 10 withdrawn from the water. Once the trawl 10 is aboard the boat, rope 30 is loosened and the captured shrimp released for conventional icing and storage.

The piggyback net system discussed above has proven effective in bay areas with depths of 7'-30'.

Alternatively, another embodiment of the present invention is illustrated in FIGS. 3-5. FIG. 3 is a perspective view which shows the back portion 50 of trawl 11 with an upper deck 52 and a lower deck 54 formed by the addition of net partition 56. The net partition extends from one side wall 61 to the other side wall 63 of the net from the throat 55 to the back end 57 of the net. Upper deck 52 has an open end 58 and a releasably closable end 60 (with draw rope 62). Lower deck 54 has a first open end 64 and a second open end 66. A piggyback net 21 may additionally be attached to trawl 11 as discussed above and may be seen in FIGS. 3 and 5. Piggyback net 21 has a front open end 23 attached at opening 35 in the top side of trawl 11 and a closable back end 27 (by rope 29).

The trawl 11 of FIGS. 3-5 is used in gulf areas with depths in the 30' to 600' range. As with the embodiment of FIGS. 1 and 2, activation of pulser 32 results in the targeted species (mature shrimp) being captured in the upper deck portion 52 while non-targeted species and debris pass through deck 54 and out opening 66. Few mature shrimp are captured in piggyback net 21.

It should be understood that the piggyback net 21 may be eliminated in situations where the operator simply desires to have a two deck type net for exclusive use in the deeper bodies of water such as the gulf or ocean.

With the alternate embodiment 11, electrodes 36 are again positioned parallel to each other on opposite side walls of the trawl below and forward of net partition 56 and above the floor 70 of the trawl, as seen in FIG. 5. The electrodes are extended generally parallel to the longitudinal axis of the trawl 11. The operation of the pulser 32 of the alternate embodiment is identical to that of the preferred embodiment as relates to its operating frequency and pulse timing.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. An apparatus for separating targeted species of aquatic life comprising:
    a first net having a body portion having two opposing side walls, a top side and a floor, a first open end, and a second open end, said body portion having an opening in said top side with a second net attached to said opening at a first open end of said second net, said second net having a second releasably closable end; and
    means positioned at and attached to said side walls, below said opening in said top side and above said floor of said body portion of said first net for stimulating said targeted species of aquatic life to enter said second net through said opening in said body portion of said first net.

2. The apparatus of claim 1 wherein said means for stimulating further comprises a pulser generating pulses in frequency ranges of 225-350 Hz at 3-5 pulses per second.

3. A shrimp trawl for separating mature shrimp from non-targeted species of aquatic life and debris comprising:
    a net body portion with a first open end and back end, said back end divided into an upper deck and a lower deck by a net partition member extending from a first side wall to a second side wall of said trawl, said upper deck having a first open end and a second releasably closable back end, said lower deck having a first open end and a second open end; and
    means positioned at and attached to said first side wall and to said second side wall below and forward of said net partition member of said trawl for selectively stimulating said mature shrimp to enter said first open end of said upper deck while allowing said non-targeted species of aquatic life and debris to pass along said lower deck and out said second open end in said lower deck.

4. The trawl of claim 2 wherein said means for stimulating further comprises a pulser generating pulses in frequency ranges of 225-350 Hz at 3-5 pulses per second.

5. A method for separating targeted and non-targeted species of aquatic life comprising the steps of:
- towing a shrimp trawl in a body of water containing said targeted and non-targeted species, said trawl further comprising:
  - a first net having a body portion having two opposing side walls, a top side, a floor, a first open end, and a second open end, said body portion having an opening in said top side with a second net attached to said opening at a first open end of said second net, said second net having a second releasably closable end;
  - means positioned at and attached to said side walls below said opening in said top side and above said floor of said body portion of said first net for stimulating said targeted species of aquatic life to enter said second net through said opening in said body portion of said first net;
- activating said means for stimulating said targeted species; and
- withdrawing said trawl from said body of water.

6. The method of claim 5 wherein said means for stimulating further comprises a pulser generating pulses in frequency ranges of 225-350 Hz at 3-5 pulses per second.

7. An apparatus for separating targeted species of aquatic life comprising:
- a first net having a body portion with a first open end and a second end, said body portion having an opening in a top side with a second net attached to said opening at a first open end of said second net, said second net having a second releasably closable end; and
- a means attached to said first net for stimulating said targeted species of aquatic life to enter said second net through said opening in said body portion of said first net, said means for stimulating further comprising a pulser generating pulses in frequency ranges of 225-350 Hz at 3-5 pulses per second.

8. The method for separating targeted and non-targeted species of aquatic life comprising the steps of:
- towing a shrimp trawl in a body of water containing said targeted and non-targeted species, said trawl further comprising:
  - a first net having a body portion with a first open end and a second open end, said body portion having an opening in a top side with a second net attached to said opening at a first open end of said second net, said second net having a second releasably closable end;
  - a means for stimulating said targeted species of aquatic life to enter said second net through said opening in said body portion of said first net, said means for stimulating further comprising a pulser generating pulses in frequency ranges of 225-350 Hz at 3-5 pulses per second;
- activating said means for stimulating said targeted species; and
- withdrawing said trawl from said body of water.

9. A shrimp trawl for separating mature shrimp from non-targeted species of aquatic life and debris comprising:
- a net body portion with a first open end and back end, said back end divided into an upper deck and a lower deck by a net partition member extending from a first side wall to a second side wall of said trawl, said upper deck having a first open end and a second releasably closable back end, said lower deck having a first open end and a second open end; and
- a means attached to said trawl for selectively stimulating said mature shrimp to enter said first open end of said upper deck while allowing said non-targeted species of aquatic life and debris to pass along said lower deck and out said second open end in said lower deck, said means for stimulating further comprising a pulser generating pulses in frequency ranges of 225-350 Hz at 3-5 pulses per second.

* * * * *